(12) United States Patent
Rayment et al.

(10) Patent No.: US 7,693,105 B2
(45) Date of Patent: *Apr. 6, 2010

(54) INTEGRATED WIRELESS DISTRIBUTION AND MESH BACKHAUL NETWORKS

(75) Inventors: Stephen G. Rayment, Ottawa (CA); Bernard Herscovich, Kanata (CA)

(73) Assignee: Belair Networks Inc., Kanata, Ontario (CA)

( * ) Notice: Subject to any disclaimer, the term of this patent is extended or adjusted under 35 U.S.C. 154(b) by 645 days.

This patent is subject to a terminal disclaimer.

(21) Appl. No.: 11/592,994

(22) Filed: Nov. 6, 2006

(65) Prior Publication Data

US 2007/0047514 A1    Mar. 1, 2007

Related U.S. Application Data

(62) Division of application No. 10/183,730, filed on Jun. 28, 2002, now Pat. No. 7,164,667.

(51) Int. Cl.
*H04B 7/216* (2006.01)
*H04L 12/56* (2006.01)

(52) U.S. Cl. .................. 370/329; 370/230; 370/400

(58) Field of Classification Search ............. 370/328, 370/329, 400, 401, 389, 230
See application file for complete search history.

(56) References Cited

U.S. PATENT DOCUMENTS

| | | | |
|---|---|---|---|
| 4,939,726 | A | 7/1990 | Flammer et al. |
| 5,115,433 | A | 5/1992 | Baran et al. |
| 5,479,400 | A | 12/1995 | Dilworth et al. |
| 5,488,608 | A | 1/1996 | Flammer, III |
| 6,219,346 | B1 | 4/2001 | Maxemchuk |
| 6,298,053 | B1 | 10/2001 | Flammer, III et al. |
| 6,370,185 | B1 | 4/2002 | Schmutz et al. |
| 6,618,355 | B1 | 9/2003 | Gulliford et al. |
| 2002/0012336 | A1 | 1/2002 | Hughes et al. |
| 2002/0015397 | A1 | 2/2002 | Hughes et al. |
| 2002/0015402 | A1 | 2/2002 | Hughes et al. |
| 2002/0027896 | A1 | 3/2002 | Hughes et al. |
| 2002/0042274 | A1 | 4/2002 | Ades |

(Continued)

FOREIGN PATENT DOCUMENTS

WO    WO 00/46958    8/2000

(Continued)

*Primary Examiner*—John Pezzlo
(74) *Attorney, Agent, or Firm*—Cassan Maclean (57) ABSTRACT

Networks, devices and methods related to wireless networking. A wireless network using nodes that perform both distribution and backhaul functions is provided. These nodes constitute the key elements of a wireless network that would be deployed and controlled by a wireless network operator. Each node contains a distribution wireless module which is wirelessly coupled to the wireless end user device using a point to multipoint scheme. Also integrated into each node is at least one backhaul wireless module with a directional wireless antenna. Each backhaul wireless module communicates by way of a point to point wireless link with the backhaul module of one other node. The nodes in the wireless network are interconnected to form a mesh backhaul network. Because of the nature of a mesh network, data traffic can be routed around obstacles that may prevent line of site links. Furthermore, the mesh network allows dynamic routing of data traffic to avoid congestion points or downed links in the network.

9 Claims, 5 Drawing Sheets

U.S. PATENT DOCUMENTS

| | | |
|---|---|---|
| 2002/0044537 A1 | 4/2002 | Ades et al. |
| 2002/0159409 A1 | 10/2002 | Wolfe et al. |
| 2004/0171400 A1 | 9/2004 | Rosen et al. |
| 2005/0153725 A1* | 7/2005 | Naghian et al. ............. 455/520 |

FOREIGN PATENT DOCUMENTS

| | | |
|---|---|---|
| WO | WO 01/24600 | 4/2001 |
| WO | WO 02/51018 | 6/2002 |

* cited by examiner

INTEGRATED WIRELESS DISTRIBUTION AND MESH BACKHAUL NETWORKS

CROSS REFERENCE TO RELATED APPLICATIONS

The present application is a divisional of U.S. patent application Ser. No. 10/183,730 filed 28 Jun. 2002 now U.S. Pat. No. 7,164,667.

FIELD OF THE INVENTION

The present invention relates to wireless communications and is particularly applicable but not limited to networks, devices and methods for flexible, high capacity, integrated wireless distribution and mesh point to point backhaul networks.

BACKGROUND TO THE INVENTION

The communications revolution of the past few years has seen an explosion in the number of wireless devices. Cellular telephones, personal digital assistants (PDAs), laptops, and other consumer devices are using wireless technology to provide connectivity to their users. Wireless technology is currently being used to provide voice-based services for cellular and PCS (Personal Communication Services) telephones, with increasing need for into building coverage. PDAs and laptops can now access the Internet and local dedicated intranets, giving end users access to not only email but also to World Wide Web based content. The increased demand for access to more services in more locations imposes higher performance demands on the wireless infrastructure.

One major problem facing wireless networks is backhaul data transmission. As cellular and PCS voice utilization inside buildings increases and as the data transfer rate provided to the end user increases, the backhaul network feeding the localized wireless nodes gets heavily burdened. Each local wireless node servicing local wireless end users must be fed traffic from public and/or private, voice and/or data networks. As each end user demands coverage in more areas and higher data throughput, the backhaul network, the network that feeds the localized wireless nodes that actually distribute data traffic to individual end users, has to provide more and more data capacity. Further, as wireless data speed requirements increase, cell sizes—the area serviced by the localized wireless nodes—must shrink. As cell density increases, then, so does the number of backhaul nodes and links that are needed to feed the cells. In fact, the number of backhaul links increases inversely with the square of the wireless nodes' cell radius.

Because of the above, high speed, high capacity wireless networks have generally been limited by backhaul bandwidth. Such bandwidth, previously provided by copper, optical or microwave radio links, comes at a very great cost to the operator and deployer of the wireless network. A wireless backhaul is clearly an attractive alternative.

However, network designers do face difficulties in using wireless technology to link the wireless nodes (which distribute the signals to a wireless end user) back to the wired network. It is desirable to maximize the range between the wireless nodes and the wired network to provide the operator with the greatest freedom in network deployment location. However, many deployments, such as in dense urban areas, do not allow for line of sight links from all wireless nodes to the wired network interface. Even if line of sight is possible, the variable propagation performance of wireless links and the constant changes in the nature and location of traffic demand make dedicated point to point links less than optimal. In addition, hauling all links back to a central point leads to high signal congestion at that point.

Previous attempts to remedy the above issues have met with limited success. A number of patents assigned to Metricom, Inc. have attempted to solve the above issues. U.S. Pat. No. 5,479,400 envisions a multipoint to multipoint system with relay nodes receiving multiple wireless signals from multiple repeater nodes. Unfortunately, the system suffers from the possibility of signal congestion at both the repeater and the relay nodes.

SkyPilot Networks, Inc. (www.skypilot.com) proposes a similar multipoint to multipoint wireless network with every subscriber node being coupled to every other node surrounding it. Data can then travel across any one of the links to arrive at the destination. Unfortunately, the performance of this type of network is highly dependent on the presence and location of the subscriber's equipment. It suffers from limits to scalability—since each subscriber node is potentially a connecting link for all traffic, each subscriber node can potentially become clogged with data traffic. In addition, there are problems in seeding initial network coverage. Furthermore, there is a greater potential lack of privacy between subscribers since each node can become an intercept point for network wide data leaks.

Mesh Networks, Inc. (www.meshnetworks.com) has taken a similar approach with a different application and implementation in mind. An ad hoc wireless peer to peer network is created using low power mobile end user wireless devices. User devices, now mobile, become integral routing points for data traveling through the network. Unfortunately, this approach requires large numbers of end user devices in a given area to work properly. Furthermore, the unpredictable nature of the end users' presence and location, most of whose devices will form part of the routing network, makes for unpredictable and potentially unreliable system availability and performance.

What is therefore required is a system that mitigates the drawbacks of the prior art and provides an improved solution. The solution should ideally allow flexible allocation of higher bit rates between nodes and should be readily deployable in non line of sight environments, offering reliable service to all subscribers at each node.

SUMMARY OF THE INVENTION

The present invention provides networks, devices and methods related to wireless networking. A wireless network using nodes that perform both distribution and backhaul functions is provided. These nodes constitute the key elements of a wireless network that would be deployed and controlled by a wireless network operator. Each node contains a distribution wireless module which is wirelessly coupled to the wireless end user device using a point to multipoint scheme. Also integrated into each node is at least one backhaul wireless module with a directional wireless antenna. Each backhaul wireless module communicates by way of a point to point wireless link with the backhaul module of one other node. The nodes in the wireless network are interconnected to form a mesh backhaul network. Because of the nature of a mesh network, data traffic can be routed around obstacles that may prevent line of site links. Furthermore, the mesh network allows dynamic routing of data traffic to avoid congestion points or downed links in the network.

In an aspect of the present invention there is provided, a wireless network for providing services to a plurality of end users, the network comprising:

a plurality of routing nodes for routing traffic by using at least one wireless signal, each routing node being wirelessly coupled to at least one other node, at least one network aggregation node for routing said traffic between said wireless network and another network, the or each network aggregation node being coupled to at least one routing node;

wherein at least one routing node also performs a distribution function for distributing said traffic to at least one wireless end user device.

BRIEF DESCRIPTION OF THE DRAWINGS

A better understanding of the invention will be obtained by considering the detailed description below, with reference to the following drawings in which.

DETAILED DESCRIPTION

Figure 1:
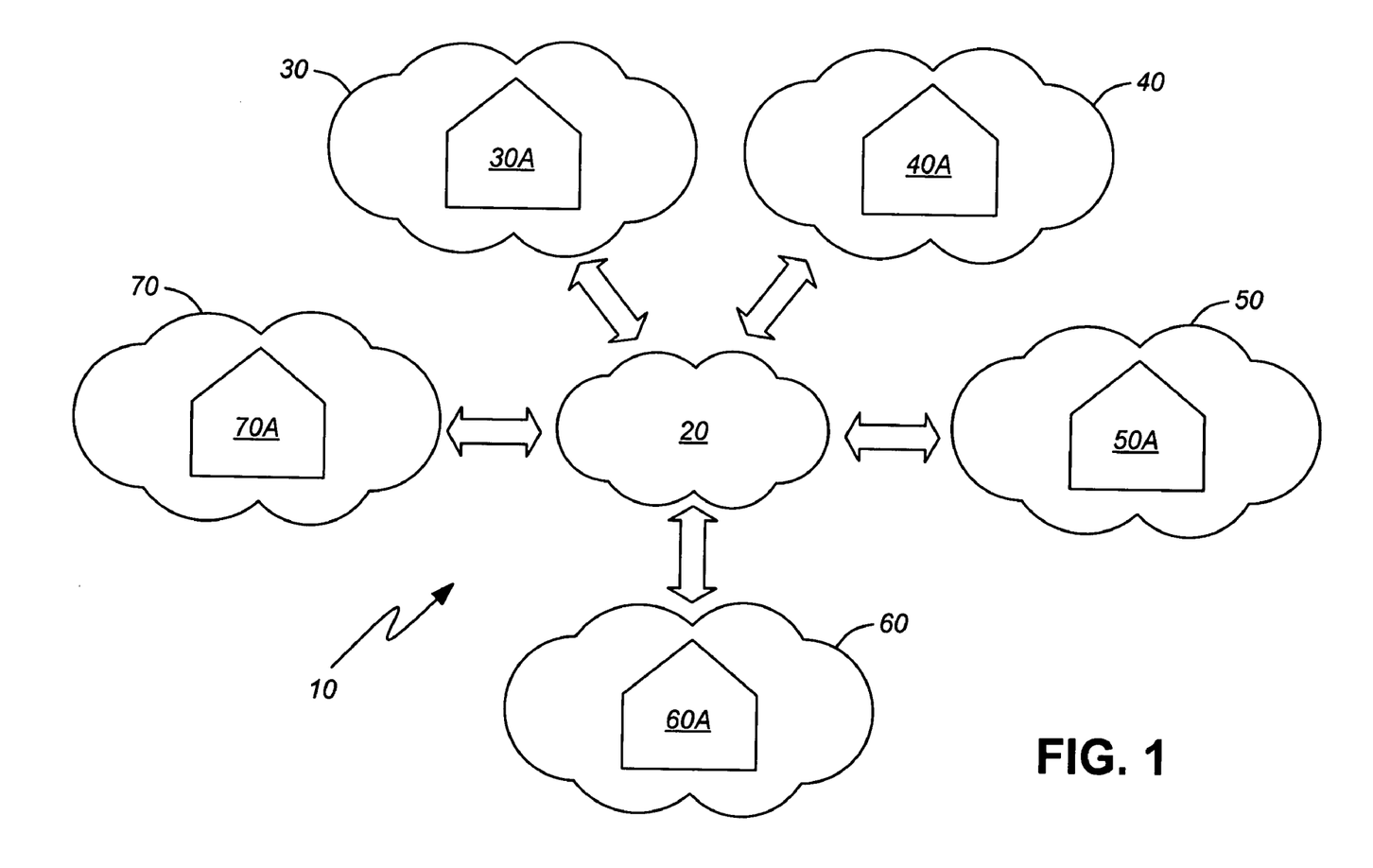
FIG. 1 is a top level large network block diagram illustrating a number of subnetworks coupled to a core network.

Referring to FIG. 1, a block diagram of a large network 10 is illustrated. The network 10 consists of a core network 20 and wireless networks 30, 40, 50, 60, 70, each of which has a network aggregation node 30A, 40A, 50A, 60A, 70A. The core network 20 may be a public and/or private, voice and/or data network. Each wireless network covers a specific geographic region. Each network aggregation node 30A-70A directly connects to the core network 20 by conventional means such as copper wire, fiber optic cable or microwave radio transmission. Each network aggregation node 30A-70A then distributes data from the large network to end users within the geographic region of the coverage of its wireless network.

Figure 2:
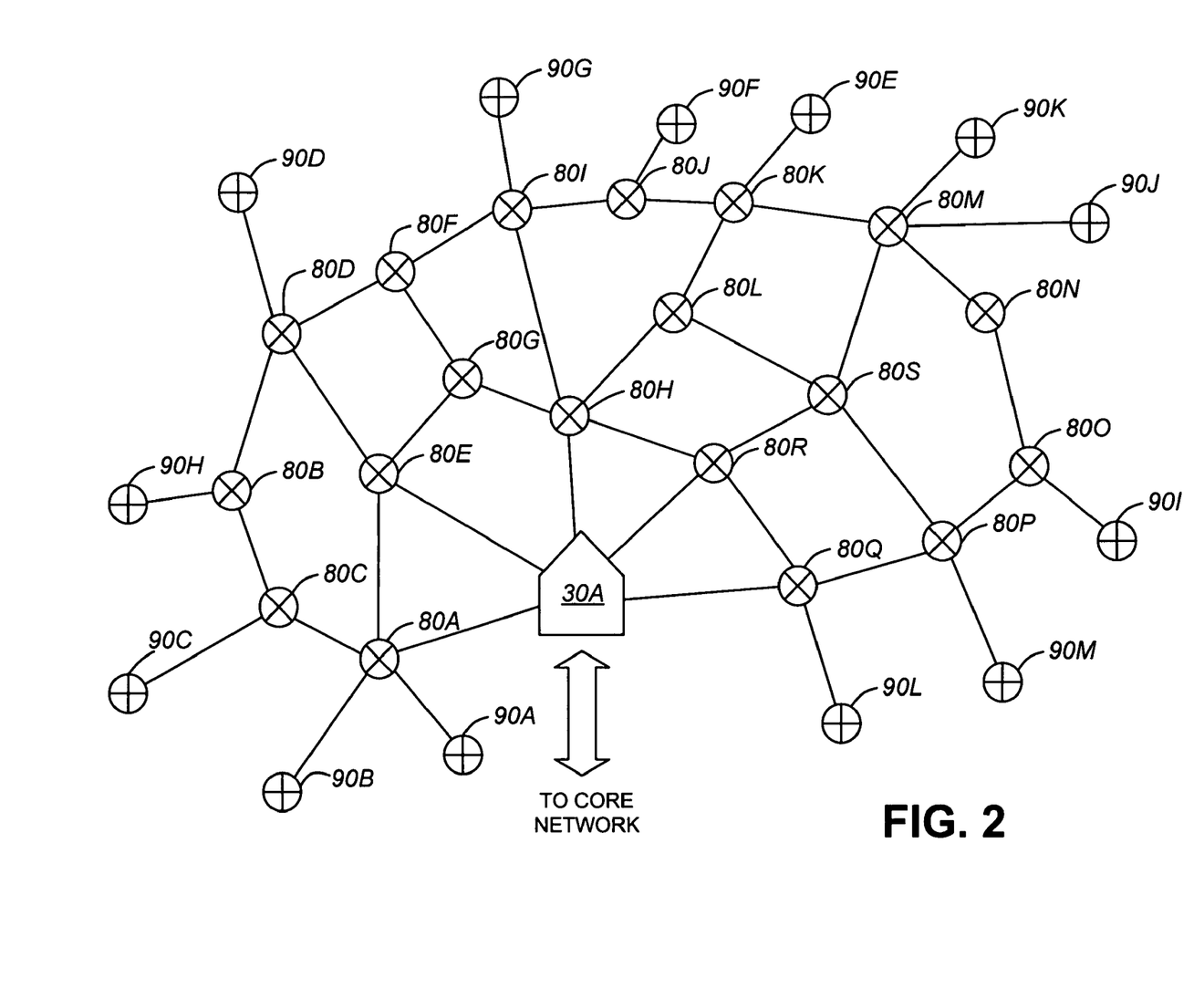
FIG. 2 is a block diagram of a wireless subnetwork with a network aggregation node and multiple routing nodes and end nodes.

Referring to FIG. 2, a block diagram of the wireless network 30 in FIG. 1 is illustrated. As can be seen, the network aggregation node 30A is connected to a core network as shown previously in FIG. 1. The wireless network 30 consists of a wireless network aggregation node 30A, a number of routing nodes 80A-80S and a number of end nodes 90A-90M. The routing nodes 80A-80S are interconnected to form a mesh network. The connections between the routing nodes and the end nodes are as follows:

| Routing Node | Connected to Network Aggregation Node 30A | Connected to Routing Nodes | Connected to End Nodes |
|---|---|---|---|
| 80A | YES | 80E, 80C | 90A, 90B |
| 80B | NO | 80D, 80C | 90H |
| 80C | NO | 80A, 80B | 90C |
| 80D | NO | 80E, 80B, 80F | 90D |
| 80E | YES | 80D, 80G, 80A | |
| 80F | NO | 80D, 80I, 80G | |

-continued

| Routing Node | Connected to Network Aggregation Node 30A | Connected to Routing Nodes | Connected to End Nodes |
|---|---|---|---|
| 80G | NO | 80E, 80F, 80H | |
| 80H | YES | 80G, 80I, 80L, 80R | |
| 80I | NO | 80F, 80H, 80J | 90G |
| 80J | NO | 80I, 80K | 90F |
| 80K | NO | 80J, 80L, 80M | 90E |
| 80L | NO | 80H, 80K, 80S | |
| 80M | NO | 80K, 80S, 80N | 90K, 90J |
| 80N | NO | 80M, 80O | |
| 80O | NO | 80N, 80P | 90I |
| 80P | NO | 80Q, 80S, 80O | 90M |
| 80Q | YES | 80R, 80P | 90L |
| 80R | YES | 80H, 80S, 80Q | |
| 80S | NO | 80L, 80M, 80P, 80R | |

A network aggregation node performs routing of traffic, either between nodes in the wireless network, or between the wireless network and the core network. The network aggregation nodes terminates backhaul links from routing or end nodes in the wireless network. Network aggregation nodes may also perform a distribution function where there is a need to provide service to subscribers near the aggregation point.

A main function of a routing node is to perform backhaul and routing of traffic from a source to a destination. Each routing node is coupled to at least one other routing node (or the aggregation node) by a point to point wireless link Most routing nodes also perform a distribution function in that they communicate with end user devices, using a multipoint wireless link, to receive and distribute traffic to and from these end user devices.

End nodes, on the other hand, only receive traffic from end user devices for transmission to a routing node (or the aggregation node) and they distribute traffic received from routing nodes (or the aggregation node) to end user devices.

From the above, the main functions of a routing node are a superset of the functions of an end node. A routing node serves to route traffic from a source, such as an end user device in the same wireless network or a node in the larger network, to a destination, again such as an end user device in the wireless network or in another network. The traffic is sent encoded in at least one wireless signal that is transmitted from one routing node to another in the wireless network until it reaches its destination—either an end user device or the network aggregation node. If the destination is the network aggregation node, the traffic can be further routed via the core network to its ultimate destination. If the destination is an end user, the traffic is distributed to the end user device serviced by an appropriate routing or end node. It should therefore be clear that both routing and end nodes communicate with the end user devices and distributes the traffic which has been routed via other routing nodes. Both end and routing nodes receive traffic from the end user devices that they service and transmit this traffic to the appropriate routing or aggregation node for routing to their destination.

It should be noted that, in performing the distribution function, each routing node or end node communicates with multiple wireless end user devices. This point to multipoint nature of the distribution function is in contrast to the point to point nature of the backhaul function of the routing node. Each wireless link between routing nodes in the wireless network is independent of any other and, due to this, each link can serve as a back up or a redundancy for the other links. If a wireless link between two routing nodes fails or is congested, the network can adaptively re-route traffic around the blockage or the congestion. As an example, referring to FIG. 2, if traffic destined for end node 90F originates from the network aggregation node 30A, one sequence of routing nodes that can be traversed is that of 30A-80H-80I-80J-90F. However, if the wireless link between routing nodes 80I and 80H goes down for any number of reasons, the traffic can be rerouted to the following sequence of routing nodes: 30A-80H-80L-80K-80J-90F. This can be implemented by providing each routing node with a table of destinations and primary and secondary next hops for that destination. Thus, for a destination in node 90F, the table in node 80H will have a primary next hop as node 80I with a secondary hop as node 80L and perhaps a tertiary next hop as node 80G. Each routing node thus continually checks the status of its links to determine if they are available or not. If traffic destined for a certain destination has a primary hop that is unavailable, then the traffic is sent to the secondary next hop or, alternatively, to a tertiary next hop. The time-varying data regarding the availability of the links that a routing node may use are then distributed to other routing nodes so that each routing node may have a map of the prevailing conditions in the wireless network.

While the above explanation posits routing traffic based on the availability of wireless links between routing nodes, other routing schemes may be used. As an example, routing schemes based on balancing the data transmission loads between links for at least some of the routing nodes in the wireless network may be used. These and other routing schemes are known to those skilled in the art and should be chosen based on the circumstances surrounding each specific implementation. Flammer III, in U.S. Pat. No. 5,488,608, incorporated herein by reference, discloses one such routing scheme which may be used. Similarly, Flammer et al. in U.S. Pat. No. 4,939,726 and Baran et al. in U.S. Pat. No. 5,115,433, both of which are incorporated herein by reference, disclose other routing schemes which may be used.

One possible routing scheme is derived from known link state routing techniques. This routing scheme is particularly applicable to wireless networking as link state routing schemes have advantages in robustness and convergence speed, two characteristics important for wireless networks.

For this routing scheme, each node has a router daemon which performs four functions:

a) The daemon greets and establishes contact with neighboring nodes by sending identifying packets to the neighboring nodes.

b) The daemon constructs and sends to each neighboring node a link state packet. Each link state packet contains the address/name/identifying indication of the originating node, the originating node's neighboring nodes, and, for each neighboring node, a cost associated with a dedicated link between the neighboring node and the originating node.

c) Each link state packet is transmitted to all the other nodes and is provided with either time stamps or sequence numbers. The time stamps and/or sequence numbers are used to ensure that the latest data is being used for any particular routing node. The daemon keeps track of these link state packets and ensures that the latest data is being used for all nodes in the network.

d) Each routing daemon in each node then continuously computes routes to each destination within the wireless network using its own home node as the starting point. This calculation can be done using, among others, the well-known Dijkstra Shortest Routing Path algorithm. This and other algorithms for calculating routing paths based on costs associated with each link may be found in texts such as "Introduction to Algorithms", McGraw-Hill, 1990. For optimum results, the data traffic should be routed to a route in which the combined cost is minimal.

As noted above, a cost is associated with each link between two nodes in the wireless network. For each link, the cost can be derived from:

1) bit rate information for the link found the adaptive modulators used at the physical layer of the link 2) link utilization information extracted from parameters, such as delay, measured at each node.

This cost for each link can be automatically calculated at the initiation or startup of the link using the bit rate information referred to above. The cost can thereafter be updated for any changes in the bit rate and, optionally, using link utilization information as outlined above. These steps will provide a reasonably instantaneous indication of the cost for each link. Such time-varying information, in conjunction with the routing scheme outlined above, will allow each node to determine the most efficient routing path through the network for its traffic. This time-varying information will ensure that, for any given time period, the most efficient path will in all likelihood be used for traffic to traverse the wireless network.

Since the backhaul links are independent point to point connections, the allocation of transmission capacity between the two ends of a given backhaul link can be determined between the two ends independently of any other link. The allocation of capacity in the two directions may be predetermined—fixed or under operator control. Alternatively a protocol can negotiate between the two ends to decide on the flow of traffic on the basis of packets queued at each end of the link. The number or size of the packets can be used to determine which end is to transmit. This and other parameters of the link can be negotiated between the two ends of the link. Additionally for multimedia traffic, priority tags may be used with the packets as they are queued and Quality of Service (QoS) management may be used to alter the transmission order of the packets.

To improve the performance of each of the point to point backhaul connections, interference between backhaul radios within a given routing node should be minimized. For applications in which time division duplex transmission (TDD) is used for interleaving receive and transmit data transmissions, the backhaul radios in a single node may be synchronized. This will ensure all radios in a single node are transmitting during the same interval so as not to desensitize nearby backhaul radio receivers. This synchronization can be implemented by injecting a framing signal into the protocol processors within each node. The timing of transmit packets on all links for a particular node are then referenced by the processors to that framing signal.

Compared to traditional wireless networks, where links are statically assigned, the network explained here is particularly useful for applications where propagation characteristics change and traffic volumes and congestions fluctuate. Each routing node can be deployed at a street corner or rooftop where it may have a point to point line of sight wireless link with at least one other routing node or end node. While line of sight is not necessary for a point to point wireless link, much greater data throughput and transmission spreads and/or distances can be achieved with such links. Furthermore, while direct line of sight from the network aggregation node may not be possible to each and every routing or end node, by routing traffic from the network aggregation node through multiple routing nodes, the range of a wireless network can be greatly extended. As an example, if the network aggregation node 30A can only have line of sight access to routing nodes 80A, 80E, 80H, 80R, 80Q with each routing node being within 5 kilometers of the network aggregation node, by routing traffic through the routing nodes, traffic can reach end node 90F which may be as far as 20 km away from the network aggregation node 30A.

It should be clear that for the distribution function, each routing or end node has a limited geographic coverage in that only wireless end users within that geographic coverage can receive services from a particular node. Thus, wireless end user device being serviced by node 90C cannot be serviced by node 90M. Each node therefore covers a "cell", a geographic area in which users can be serviced by a particular node. While cells may overlap, each node can service end user devices which are in its cell. To extend the coverage of the wireless network to multiple isolated islands, between which no coverage is required, dedicated routing nodes which only perform the backhaul function and not the distribution function may be used.

Figure 3:
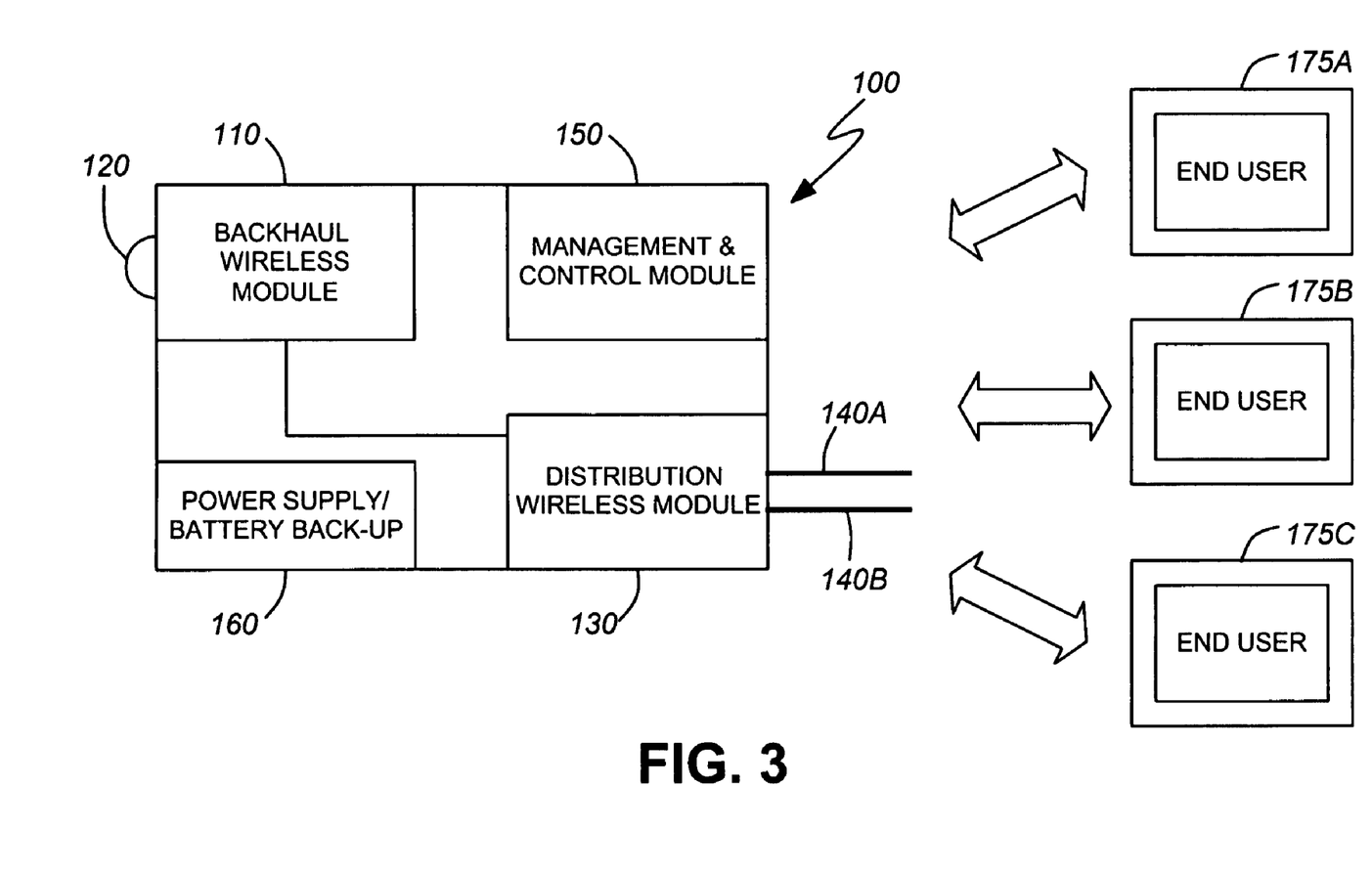
FIG. 3 is a block diagram illustrating the modules in an end node.

To implement the above wireless network, FIG. 3 illustrates a block diagram for an end node device 100. The end node device 100 has a backhaul wireless module 110 coupled to a directional antenna 120. A multipoint distribution wireless module 130 is coupled to antennae 140A, 140B. It is suggested that two antennae be used to implement spatial or polarization diversity, thereby increasing the range of each multipoint radio. The backhaul and distribution radios may use common or separate frequency bands depending on the capacity required and the radio spectrum available. A management and control module 150 controls node operation and routing functions and implements protocols such as SNMP (Simple Network Management Protocol) for network management functions. A power supply/battery backup module 160 provides power to the end node device 100. The backhaul wireless module 110 receives a wireless signal by way of the antenna 120 from a neighboring routing node. The traffic encoded in the wireless signal is then extracted and encoded for the different end user devices, 175A, 175B, 175C, that are its destinations. These wireless signals are then sent to the end user devices by way of the multipoint distribution wireless module 130 and the antennae 140A, 140B. Traffic is received by the end node from these end user devices by way of the multipoint distribution wireless modules 130 and the multipoint antennae 140A, 140B and this traffic is extracted, re-encoded, and sent to the backhaul wireless module 110 and its antenna 120. This encoded traffic is then transmitted by the backhaul wireless module 110 to the wireless network for routing to its destination.

Figure 4:
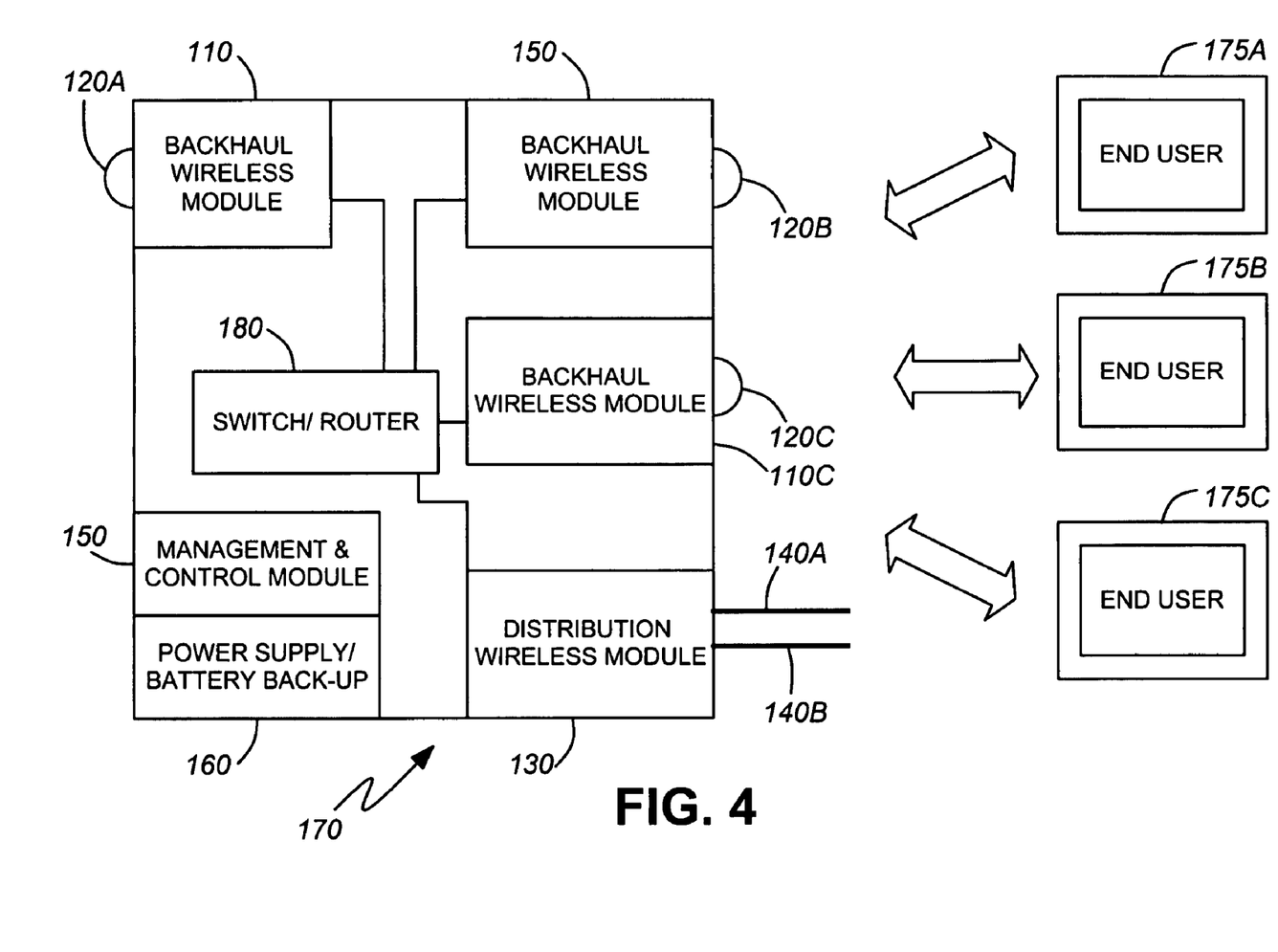
FIG. 4 is a block diagram illustrating the modules in a routing node.

Referring to FIG. 4, a block diagram of a routing node device 170 is illustrated. This routing node device 170 performs both distribution and backhaul functions. As can be seen, the routing node device 170 is equipped with three backhaul wireless modules 110A, 110B, 110C with their corresponding directional antennae 120A, 120B, 120C. A multipoint distribution wireless module 130 and its antennae 140A, 140B, are present along with a management and control module 150 and power supply/battery backup module 160. Similar to the device 100 in FIG. 3, the multipoint distribution wireless module 130 communicates with end user devices 175A, 175B, 175C. A switch/router module 180 is coupled to all the wireless modules—backhaul wireless modules 110A, 110B, 110C and multipoint distribution wireless module 130. The switch/router module 180 routes traffic within the routing node device 170 to their proper wireless module interim destinations. As an example, information in traffic received from another routing node by way of one of the backhaul wireless modules may be destined for another routing node or it may be destined, via the distribution module, for an end user device currently being serviced by this routing node. If the information within that traffic is destined for another routing node, then the information is sent to one of the other backhaul wireless modules for transmission to a neighboring routing node. If the traffic is destined for an end user device currently being serviced by this particular routing node 170, then the traffic is routed by the switch/router 180 to the multipoint distribution wireless module 130. Otherwise, the traffic is routed to one of the other backhaul wireless modules 110B, 110C. This switch/router module 180, in conjunction with the management and control module 150, would implement whichever routing scheme is chosen.

In contrast to the above description of a regular routing node, a dedicated routing node is a routing node which only performs the backhaul function and not the distribution function. It is generally similar to a regular routing node except for one important detail. Since the dedicated routing node will not be performing the distribution function, the dedicated routing node will not have the multipoint distribution wireless module 130 and antennae 140A, 140B. However, aside from this distinction, dedicated routing nodes are similar in structure and construction to regular routing nodes.

It should be noted that any wireless signal received by a routing node (or a dedicated routing node) is first decoded to extract the addressing information encoded within the traffic carried by the wireless signal. Then, based on that addressing information, the traffic is routed to another wireless module, either another backhaul wireless module or a multipoint distribution wireless module (if present). At this second wireless module, the traffic is re-encoded into a wireless signal so it can be transmitted to either another node or an end user device.

A similar process is executed by each end node. Any wireless signal received from a routing node by way of the backhaul wireless module 110 is decoded to extract the addressing information encoded within the traffic contained in the wireless signal. The traffic is then sent to the multipoint distribution wireless module 130 for re-encoding into a wireless signal and transmission to the relevant end user device. Similarly, traffic received from an end user device by way of the multipoint distribution wireless module 130 is decoded and, based on the addressing information in the traffic, sent to either the backhaul wireless module 110 (for transmitting to the wireless network by way of a neighboring routing node) or the multipoint distribution wireless module 130 (for transmitting to another end user device being serviced by the same end node).

Figure 5:
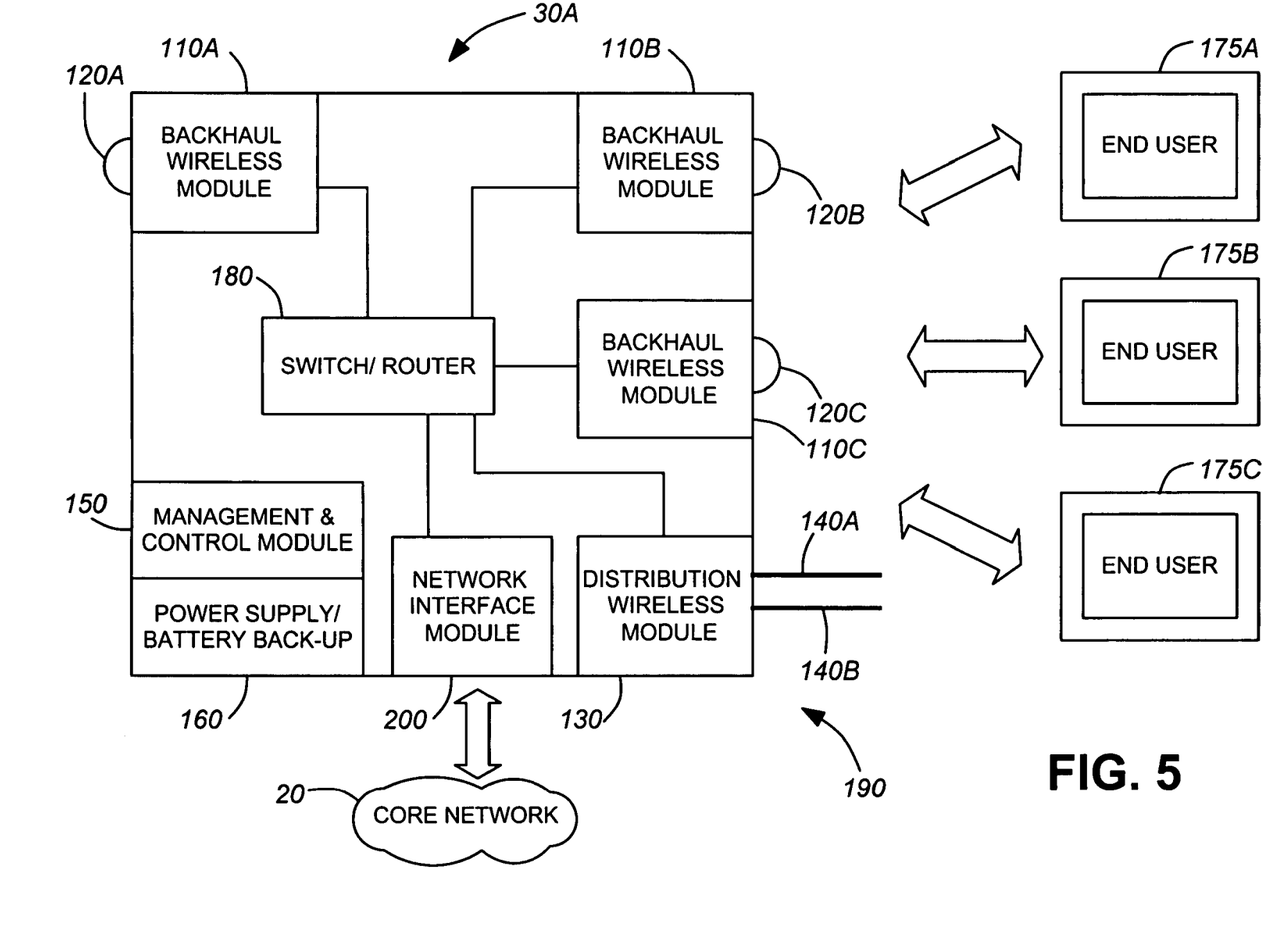
FIG. 5 is a block diagram illustrating the modules in a network aggregation node.

Referring to FIG. 5, a block diagram of a network aggregation node 30A is illustrated. As can be seen, the aggregation node device 190 is again equipped with three backhaul wireless modules 110A, 110B, 110C with their corresponding directional antennae 120A, 120B, 120C. An optional multipoint distribution wireless module 130 and its antennae 140A, 140B, are shown in this example. A distribution module will be included when there is a need to provide service to subscribers near the aggregation point. Also shown are a management and control module 150 and a power supply/battery backup module 160. A switch/router module 180 is coupled to all the wireless and wired modules. A network interface module 200 connects to the core network, using any of a variety of voice or data network interfaces and protocols, such as Ethernet, ATM (Asynchronous Transfer Mode), or traditional TDM (Time Division Multiplexing) interfaces.

To minimize external interference and maximize range, the wireless signal from backhaul module 110 ideally feeds an associated directional antenna with a narrow beamwidth. The narrowness of the beamwidth needs to be traded off against the need to avoid any line of sight pointing at installation. Beamwidths of 15-60 degrees have been found to be a reasonable compromise between the two. Other beamwidths may be tried for other specific applications.

When nodes are deployed outdoors, temperature and humidity variations and other environmental factors can wreak havoc on network performance. To minimize any environmental effects on the wireless network, each routing or end node which will be deployed in an outside environment may ideally be weather hardened. Suitable weather resistant measures, such as waterproofing the casing and screening from sun and contaminants, are advisable. The weather resistance measures may differ for different environments as nodes to be installed in a northern climate will have to deal with significantly different weather conditions from nodes to be installed in a desert or a tropical climate.

A person understanding this invention may now conceive of alternative structures and embodiments or variations of the above all of which are intended to fall within the scope of the invention as defined in the claims that follow.

What is claimed is:

1. A wireless network for providing services to a plurality of end users, the network comprising:
    a plurality of routing nodes for routing traffic by using at least one wireless signal, each routing node being wirelessly coupled to at least one other node, wherein at least one routing node also performs a distribution function for distributing said traffic to at least one wireless end user device;
    at least one network aggregation node for routing said traffic between said wireless network and another network, the or each network aggregation node being coupled to at least one routing node; and,
    at least one end node for distributing said traffic to a plurality of wireless end user devices, each end node being wirelessly coupled to at least one routing or aggregation node, each end node communicating with the or each coupled routing or aggregation node by way of a dedicated point to point link, wherein each end node comprises:
        at least one wireless backhaul module for communicating with at least one node in the wireless network; and
        a wireless distribution module for communicating with said least one wireless end user device;
    wherein,
        each end node receives said at least one wireless signal from said at least one node by way of the at least one backhaul module and transmits at least a portion of at least one of said at least one wireless signal to said at least one end user device by way of the wireless distribution module; and,
        the or each wireless backhaul module communicates with a single node in the wireless network at any one time.

2. A wireless network according to claim 1 wherein the or each network aggregation node is coupled to a core network which provides at least a portion of traffic, said traffic being encoded into said at least one wireless signal for routing to said at least one end user device.

3. A wireless network according to claim 1 wherein each of the plurality of routing nodes is coupled to at least one other routing node by way of a point to point wireless link.

4. A wireless network according to claim 3 wherein the plurality of routing nodes are wirelessly coupled to form a mesh network.

5. A wireless network according to claim 4 wherein said mesh network allows traffic to be routed from one node in the network to another node, said traffic being encoded in said at least one wireless signal.

6. A wireless network according to claim 1 wherein each distribution module wirelessly communicates with a plurality of wireless end user devices.

7. A wireless network for providing services to a plurality of end users, the network comprising:
    a plurality of routing nodes for routing traffic by using at least one wireless signal, each routing node being wirelessly coupled to at least one other node;
    at least one network aggregation node for routing said traffic between said wireless network and another network, the or each network aggregation node being coupled to at least one routing node;
    wherein at least one routing node also performs a distribution function for distributing said traffic to at least one wireless end user device and comprises:
        at least two backhaul modules; and,
        a switch/router module for routing traffic between different modules in said at least one routing node, said traffic being extracted from said at least one wireless signal,
    wherein,
        the or each routing node receives said at least one wireless signal from said at least one other node by way of the at least two backhaul modules and transmits at least a portion of at least one of said at least one wireless signal to either:
            another node in the wireless network by way of at least one backhaul module; or,
            to said at least one end user device by way of the wireless distribution module.

8. A wireless network for providing services to a plurality of end users, the network comprising:
    a plurality of routing nodes for routing traffic by using at least one wireless signal, each routing node being wirelessly coupled to at least one other node; and,
    at least one network aggregation node for routing said traffic between said wireless network and another network, the or each network aggregation node being coupled to at least one routing node;
    wherein at least one routing node also performs a distribution function for distributing said traffic to at least one wireless end user device and the or each network aggregation node comprises:
        at least one wireless backhaul module for communicating with at least one node in said wireless network;
        a switch/router module for routing traffic between different modules in said aggregation node, said traffic being extracted from said at least one wireless signal; and,
        at least one network interface module for communicating with said another network;
    wherein the or each network aggregation node receives said at least one wireless signal from said at least one node by way of the at least one backhaul module and transmits at least a portion of at least one of said at least one wireless signal to a destination selected from a group comprising:
        another node in the wireless network by way of at least one backhaul module; and,
        said another network by way of the at least one network interface module;
    wherein the or each wireless backhaul module communicates with a single node in the wireless network at any one time.

9. A wireless network according to claim 8 wherein the or each network aggregation node further comprises a wireless distribution module for communicating with at least one wireless end user device.

* * * * *

UNITED STATES PATENT AND TRADEMARK OFFICE
CERTIFICATE OF CORRECTION

PATENT NO. : 7,693,105 B2
APPLICATION NO. : 11/592994
DATED : April 6, 2010
INVENTOR(S) : Rayment et al.

It is certified that error appears in the above-identified patent and that said Letters Patent is hereby corrected as shown below:

In Column 4, Line 28, delete "link Most" and insert -- link. Most --, therefor.

In Column 9, Line 40, in Claim 1, delete "and" and insert -- and, --, therefor.

Signed and Sealed this
Fifth Day of February, 2013

Teresa Stanek Rea
*Acting Director of the United States Patent and Trademark Office*